United States Patent
Pochner et al.

(10) Patent No.: US 10,371,018 B2
(45) Date of Patent: Aug. 6, 2019

(54) DEVICE AND METHOD FOR FAST POSITION CONTROL OF A HYDRAULIC ACTUATOR

(71) Applicant: GM GLOBAL TECHNOLOGY OPERATIONS LLC, Detroit, MI (US)

(72) Inventors: Klaus Pochner, Ruesselsheim (DE); Uwe Steinmann, Nierstein (DE); Kea Hyuk Chang, Northville, MI (US); Scott T Feldmann, South Lyon, MI (US); Jon C Wasberg, Davison, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 15/468,508

(22) Filed: Mar. 24, 2017

(65) Prior Publication Data

US 2018/0274397 A1  Sep. 27, 2018

(51) Int. Cl.
| | |
|---|---|
| *F01L 1/34* | (2006.01) |
| *F01L 1/344* | (2006.01) |
| *F02D 13/02* | (2006.01) |
| *F02D 41/20* | (2006.01) |
| *F01L 13/00* | (2006.01) |
| *F02D 41/00* | (2006.01) |

(52) U.S. Cl.
CPC ............ *F01L 1/3442* (2013.01); *F02D 13/02* (2013.01); *F02D 13/0219* (2013.01); *F02D 41/20* (2013.01); *F01L 2001/3443* (2013.01); *F01L 2001/34426* (2013.01); *F01L 2013/111* (2013.01); *F01L 2201/00* (2013.01); *F01L 2800/00* (2013.01); *F01L 2820/041* (2013.01); *F02D 2041/001* (2013.01); *F02D 2041/2027* (2013.01); *Y02T 10/18* (2013.01)

(58) Field of Classification Search
CPC ........... F01L 1/3442; F01L 2001/34426; F01L 2013/111; F01L 2001/3443; F01L 2201/00; F01L 2800/00; F01L 2820/041; F02D 13/02; F02D 41/207; F02D 2041/202; F02D 13/0219; F02D 2041/2027; F02D 2041/001; Y02T 10/18
USPC ...................................................... 123/90.17
See application file for complete search history.

(56) References Cited

U.S. PATENT DOCUMENTS

| | | |
|---|---|---|
| 5,937,806 A | 8/1999 | Lyko et al. |
| 8,310,318 B2 | 11/2012 | Steinmann et al. |
| 2006/0207580 A1* | 9/2006 | Hardman ............ F02D 35/0007 123/568.21 |

(Continued)

*Primary Examiner* — Zelalem Eshete (57) ABSTRACT

A method, control system, and variable valve timing system are provided for controlling an actuator that can be switched into an on state and an off state with pulse width modulation. The systems and method include controls configured to determine an actual system parameter on a first time schedule and a desired system parameter on a second time schedule. On a third time schedule, a position error difference between the actual system parameter and the desired system parameter is determined. The third time schedule is configured to begin and to determine the position error difference each time that the actual system parameter is determined and each time that the desired system parameter is determined. A desired duty cycle is determined, and a duty cycle command is sent to a pulse width modulation output unit.

17 Claims, 5 Drawing Sheets

(56) References Cited

U.S. PATENT DOCUMENTS

2010/0042306 A1* 2/2010 Gauthier ............... F01L 1/344
   701/102
2010/0043409 A1* 2/2010 Naydenov ........... F02D 41/3082
   60/287

* cited by examiner

DEVICE AND METHOD FOR FAST POSITION CONTROL OF A HYDRAULIC ACTUATOR

TECHNICAL FIELD

The technical field pertains to a method and control system for controlling a device that can be switched into an "on" state and an "off" state with pulse duration modulation of a square wave signal.

INTRODUCTION

Pulse duration modulation, or pulse width modulation (PWM), is a method for controlling the power of an actuator between an ON state and an OFF state. The ratio between the duration of the switched-on state and the pulse repetition period is called the "pulse-duty factor" or the "duty cycle."

Such PWM systems may be used, for example, to drive an oil control valve in a cam phaser for changing the phase of the camshaft angle with respect to a crankshaft angle. Such a system may have undesirable delays, however, because an actual camshaft angle position (with respect to a crankshaft angle) is measured and stored into memory on a first independent time schedule much less frequently than a desired camshaft angle is calculated on a second independent time schedule. A third independent time schedule may be run to determine the difference between the actual camshaft angle and the desired camshaft angle, where either of the actual or desired camshaft angle may be outdated information by the time they are used in the third time schedule. A desired duty cycle may then be determined based on the difference between the actual and desired camshaft angles, which is typically implemented following the period of the previous duty cycle.

As such, the system may have delays, and since the delays occur from events on various time schedules, the length of the delays may be unpredictable and/or too slow for fast-paced systems, such as cam phaser oil valve control.

SUMMARY

The present disclosure provides synchronization between detecting an actual system parameter and determining a desired system parameter, by beginning a time schedule for determining the difference between the two each and every time that one of the actual and desired system parameters is determined. Therefore, the desired duty cycle can be calculated using the most recent actual and desired parameter information. In addition, if a large error (exceeding a predetermined threshold) exists between a desired duty cycle and an actual duty cycle, the PWM signal period may be immediately aborted and the PWM signal period can be immediately restarted with the new desired duty cycle.

In one form, which may be combined with or separate from the other forms disclosed herein, a method for controlling a device that is operable to be switched between an on state and an off state with pulse width modulation of a square wave signal is provided. The method includes performing a step A of determining an actual system parameter on a first time schedule and performing a step B of determining a desired system parameter on a second time schedule. On a third time schedule, the method includes determining a position error difference between the actual system parameter and the desired system parameter. The third time schedule is configured to begin and to run the step of determining the position error difference each time that step A is completed and each time that step B is completed. Further on the third time schedule, the method includes determining a desired duty cycle of the square wave signal. The method also includes sending a duty cycle command to a pulse width modulation output unit. The duty cycle command is configured to cause the pulse width modulation output unit to output the square wave signal having the desired duty cycle.

In another form, which may be combined with or separate from the other forms disclosed herein, a control system is provided for controlling an actuator that is operable to be switched into an on state and an off state with pulse width modulation of a square wave signal. The control system includes a system parameter detection module configured to determine an actual system parameter on a first time schedule and a system desire module configured to determine a desired system parameter on a second time schedule. A computation module is configured to run on a third time schedule, where the computation module is configured to determine a position error difference between the actual system parameter and the desired system parameter. The third time schedule is configured to begin and to run the step of determining the position error difference each time that the system parameter detection module determines the actual system parameter and each time that the system desire module determines the desired system parameter. The computation module is further configured to determine a desired duty cycle of the square wave signal. A pulse width modulation output unit is configured to output the square wave signal having the desired duty cycle, while a command module is configured to send a duty cycle command to the pulse width modulation output unit. The duty cycle command is configured to cause the pulse width modulation output unit to output the square wave signal having the desired duty cycle.

In yet another form, which may be combined with or separate from the other forms disclosed herein, a variable valve timing system for a motor vehicle is provided. The variable valve timing system includes a camshaft configured to rotate and to control opening of a poppet valve and a camshaft phaser defining a phaser cavity. A camshaft target wheel is fixed to the camshaft and has a plurality of target edges, and a camshaft sensor is provided and configured to sense the target edges. A pulse width modulated (PWM) control valve is configured to be switched into an on state and an off state with pulse duration modulation of a square wave signal to control the flow of hydraulic fluid into and out of the phaser cavity to control an angular position of the camshaft with respect to a crankshaft. A control system is provided that includes a camshaft angle detection module configured to determine an actual camshaft angle with respect to a crankshaft angle on a first time schedule based on feedback from the camshaft sensor including timing of sensing at least one target edge. A desired phase module is configured to determine a desired camshaft angle with respect to the crankshaft angle on a second time schedule. A computation module is configured to run on a third time schedule. The computation module is configured to determine a position error difference between the actual camshaft angle and the desired camshaft angle. The third time schedule is configured to begin and to run the step of determining the position error difference each time that the camshaft angle detection module determines the actual camshaft angle and each time that the desired phase module determines the desired camshaft angle. The computation module is further configured to determine a desired duty cycle of the square wave signal. A command module is configured to send a duty cycle command to the PWM control valve, where the duty cycle command is configured to cause the PWM control valve to output the square wave signal having the desired duty cycle.

Additional features may be provided, including but not limited to the following: the method or control system configured to determine an actual duty cycle of the square wave signal; the method or control system configured to determine whether a duty cycle difference between the actual duty cycle and the desired duty cycle exceeds a predetermined large error threshold on the third time schedule; if the duty cycle difference exceeds the predetermined large error threshold, immediately aborting a current pulse repetition period of the square wave signal and starting a new pulse repetition period of the square wave signal having the desired duty cycle; if the duty cycle difference does not exceed the predetermined large error threshold, finishing the current pulse repetition period of the square wave signal and starting the new pulse repetition period after the current pulse repetition period is finished; determining the desired duty cycle after determining the position error difference; the desired duty cycle being based in part on the position error difference; determining the actual duty cycle on a fourth time schedule; immediately aborting the current pulse repetition period and starting the new pulse repetition period based on the desired duty cycle if the duty cycle difference exceeds the predetermined large error threshold being performed on the third time schedule; finishing the current pulse repetition period and starting the new pulse repetition period after the current pulse repetition period is finished if the duty cycle difference does not exceed the predetermined large error threshold being performed on the fourth time schedule; wherein determining the actual system parameter on the first time schedule includes determining an actual camshaft angle with respect to a crankshaft angle; wherein determining the desired system parameter includes determining a desired phase, the desired phase being the desired camshaft angle with respect to the crankshaft angle; wherein the fourth time schedule is configured to begin and to determine the actual duty cycle when an edge of a camshaft wheel passes a camshaft sensor, the edge being a rising edge and/or a falling edge; wherein the method or control system sending the duty cycle command to the pulse width modulation output unit is configured to cause the pulse width modulation output unit to output the square wave signal to control rotational phasing between the camshaft angle and the crankshaft angle; the method or control system including controlling an oil control valve with the square wave signal to establish a pressure balance between a first chamber and a second chamber by driving the actuator; wherein the actual system parameter includes the actual camshaft angle with respect to the crankshaft angle; wherein the desired system parameter includes a desired phase; and wherein the control system is configured to control rotational phasing between the camshaft angle and the crankshaft angle.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are included for illustration only and are not intended to limit the scope of this disclosure or the appended claims.

DETAILED DESCRIPTION

The following detailed description is merely exemplary in nature and is not intended to limit application and uses.

Figure 1:
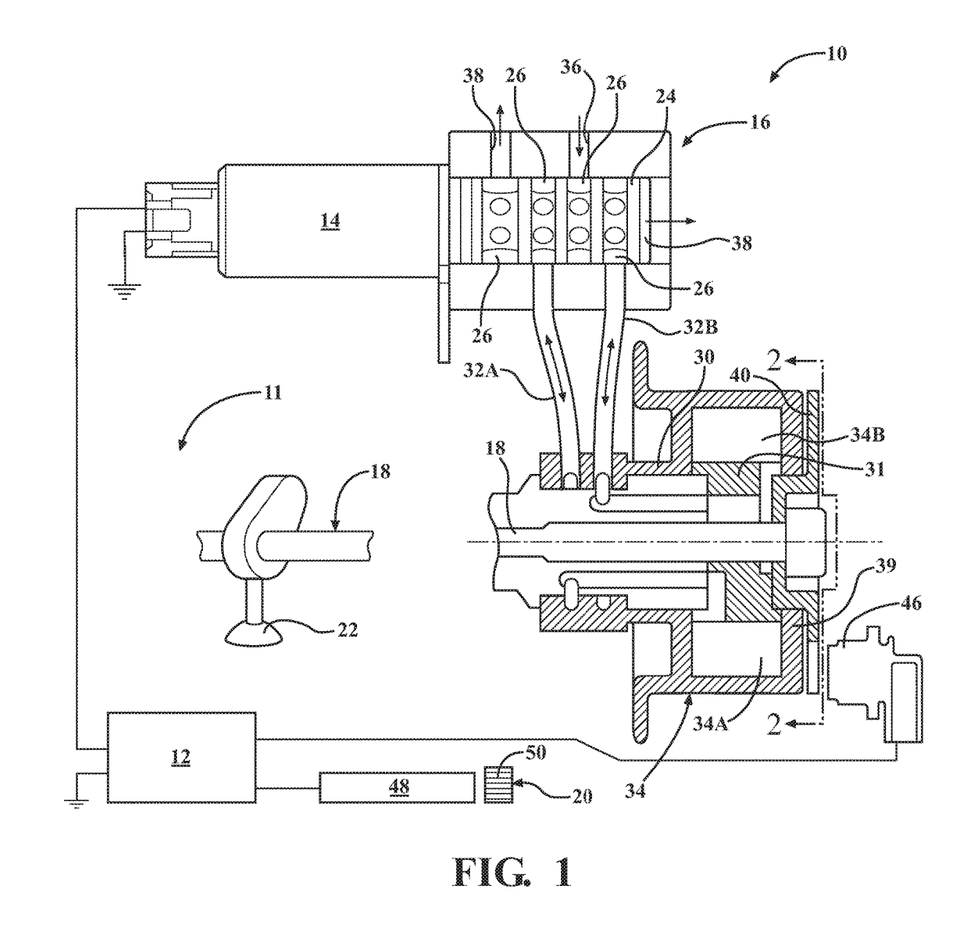
FIG. 1 is a schematic diagram of a variable valve timing system including a control system for controlling a camshaft phaser, in accordance with the principles of the present disclosure.

Referring now to FIG. 1, a variable valve timing system is illustrated and generally designated at 10. The variable valve timing system 10 may include or be part of a control system 11 including a controller 12 and a pulse width modulated (PWM) control valve 14. The PWM control valve 14 is operable to control a cam phaser actuator 16, which is configured to control and change the angular position of a camshaft 18 with respect to a crankshaft (schematically shown at 20). The camshaft 18 is configured to rotate and to control opening of a poppet valve 22 (typically multiple poppet valves 22), which are intake and/or exhaust valves of an engine cylinder, as is known in the art.

The camshaft phaser 16 defines a phaser cavity 34 having a plurality of vanes 34A, 34B between an outer ring 39 that may carry a timing belt of the engine (not shown) and an inner propeller 31 that is connected to the camshaft 18. The outer ring 39 of the phaser 16 may rotate once for every two rotations of the crankshaft 20, by way of example, and allows oil to be applied to the phaser cavity vanes 34A, 34B. A slider or piston 26 inside the phaser 16 is configured to connect supply lines 32A, 32B for the vanes 34A, 34B to either a phaser supply passage 36 or to drains 38. The slider or piston 26 may be configured to move bi-directionally, by way of example, to balance pressure between each of the vane chambers 34A, 34B. By changing the amount of hydraulic fluid (oil) supplied to the camshaft propeller 31, the angular orientation of the camshaft 18 can be shifted with respect to the angular orientation of the crankshaft 20.

A coil in the PWM control valve 14 turns the cam phaser actuator 16 into an ON state or an OFF state to control the cam phaser actuator 16. More particularly, the PWM control valve 14 is operable to switch the camshaft phaser actuator 16 into an ON state and an OFF state with pulse width modulation of a square wave signal.

Figure 2:
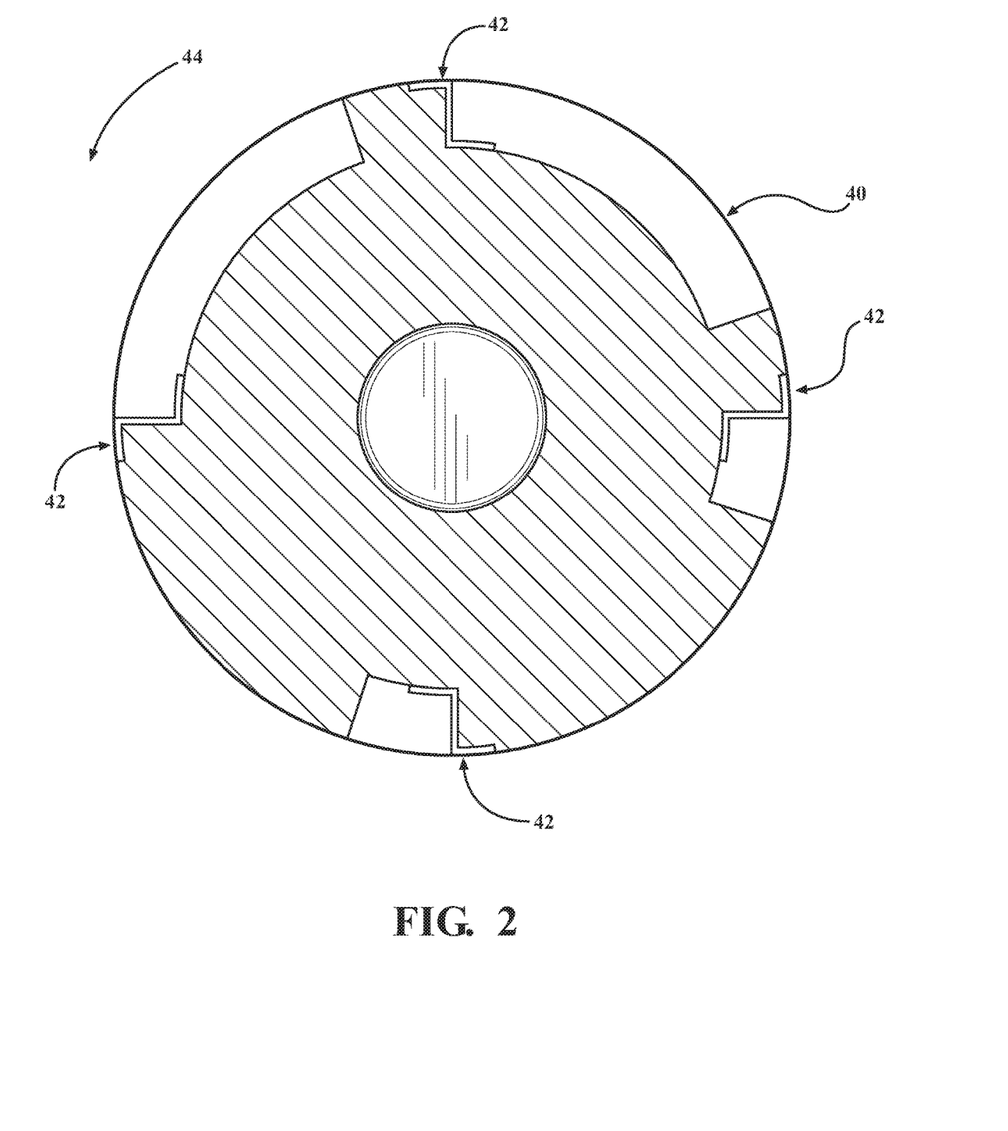
FIG. 2 is a schematic side view of a camshaft target wheel taken along the lines 2-2 of FIG. 1, according to the principles of the present disclosure.

Referring to FIGS. 1 and 2, a camshaft target wheel 40 is fixed to the camshaft 18 and with respect to the propeller 31. The camshaft target wheel 40 has a plurality of target edges 42. In this case, there are four target edges 42. In the orientation of FIG. 2, if the camshaft target wheel 40 is rotating in a counterclockwise direction as indicated by arrow 44, a camshaft sensor 46 (shown in FIG. 1) may be configured to sense the target edges 42, and more specifically, falling edges of the target edges 42. In some variations, both rising and falling edges of the target edges 42 may be detected by the camshaft sensor 46. By detecting the target edges 42, the camshaft sensor 46 is able to detect the angular position of the camshaft 18. A crankshaft sensor 48 may be used to similarly detect an angular crankshaft position, based on a plurality of teeth 50 disposed on a crankshaft wheel. The controller 12 can then correlate the angular position of the camshaft 18 with respect to the camshaft 20.

Figure 3:
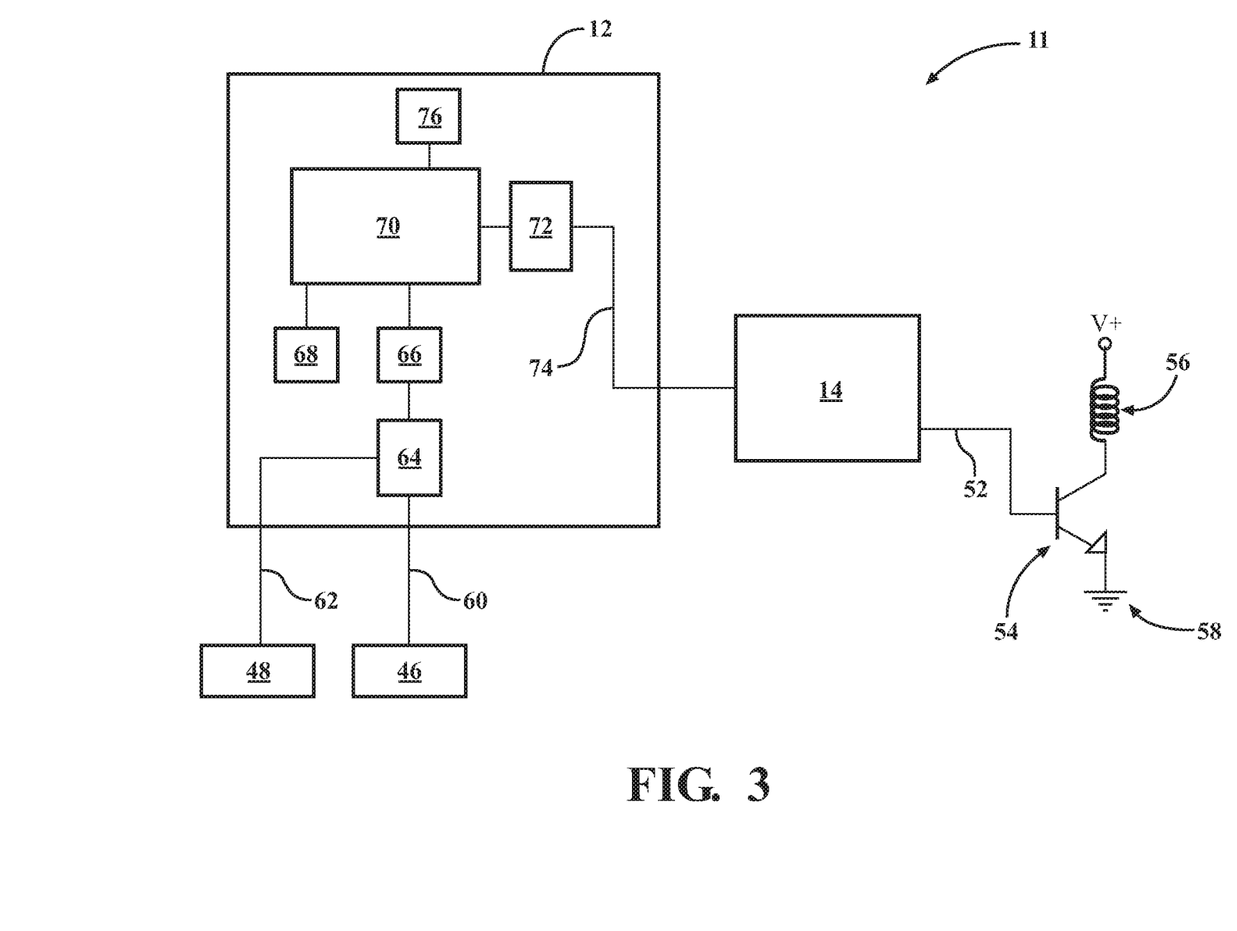
FIG. 3 is a block diagram illustrating the control system of FIG. 1, in accordance with the principles of the present disclosure.

Referring now to FIG. 3, additional details of the control system 11, including the controller 12 and the PWM control valve 14 are illustrated. It should be understand that the controller 12 may be a powertrain control module and may include one or more controllers or control systems.

The PWM control valve 14 may typically apply to the cam phaser actuator 16, for example, a variable duty cycle signal 52 to a switch 54, such as a transistor. The switch 54 may be connected between a low side of a coil 56 and a ground reference 58. The high side of the coil 56 may be connected to a supply voltage V+ of approximately 12 Volts in this example. When the PWM control valve 14 is switched on, the switch 54 conducts and current increases exponentially in the coil 56 toward an average current that is a predetermined function of the voltage across the coil 56 and coil resistance. When the PWM control valve 14 is switched off, the switch 54 is not conducting and current exponentially decays in the coil 56 toward zero. The PWM control valve 14 will be held, for a given duty cycle, substantially at a fixed position corresponding to the average current in the coil 56.

The camshaft position sensor 46 and the crankshaft position sensor 48 provide output signals 60 and 62, respectively, to the controller 12. The output signals 60, 62 may then be combined by the controller 12 to determine the relative phase between the crankshaft 20 and the camshaft 18.

The controller 12 provides for responsive, precise control of the phasing between the crankshaft 20 and the camshaft 18 to provide for emissions reduction benefits and fuel economy increase. The controller 12 may provide for control of the phasing, for example, through the control operations 100 illustrated in FIG. 4, with continued reference to the control system 11 illustrated in FIG. 3.

Figure 4:
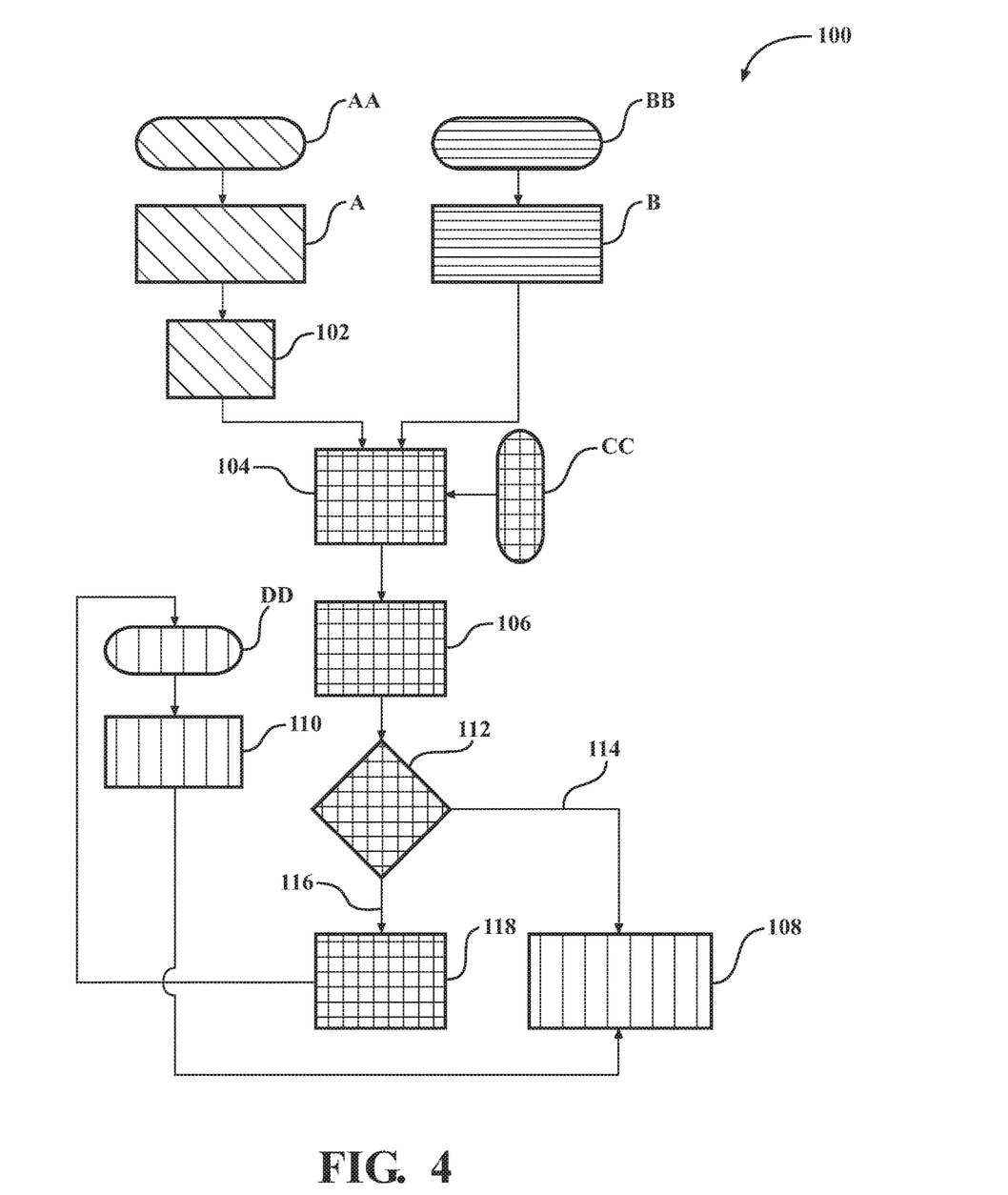
FIG. 4 is a block diagram illustrating a method of controlling a device that is operable to be switched between an on state and an off state with pulse width modulation of a square wave signal, such as the variable valve timing system shown in FIG. 1, according to the principles of the present disclosure.

For example, the controller 12 may have a system parameter detection module 64 configured to determine an actual system parameter, such as actual cam angle, on a first time schedule. Thus, the control operations or method 100 may include performing a step A of determining an actual system parameter, such as actual cam angle, on a first time schedule AA. In an example of a variable cam phasing system, the cam sensor 46 detects the edges 42 on the target wheel 40. There may be a small number of edges 42 on the cam target wheel 40, such as four edges 42 spaced about 90 degrees apart from each other. Whenever the cam sensor 46 detects an edge 42, the step A may determine the cam position, also referred to as the actual cam angle. In some cases, the cam position is the position of the detected edge 42 with respect to the crankshaft angle minus a nominal (parking) position of the edge 42, and the system parameter detection module 64 may determine the cam phasing angle as being a certain number of degrees offset from park. In this case, there are then four edges 42 per target wheel revolution, and the camshaft 18 is typically turning half as fast as the crankshaft 20. Accordingly, at an idle speed of about 600 rpm, the target edge 42 would be sensed about every 50 ms, and the first schedule AA would run about every 50 ms. The method 100 may then include a step 102 of writing the cam angle into a memory 66 each time the cam angle is detected.

The controller 12 may include a system desire module 68 configured to determine a desired system parameter, such as desired cam angle, on a second time schedule. Thus, the control operations or method 100 may include performing a step B of determining a desired system parameter, such as desired cam angle, on a second time schedule BB. In an example of a variable cam phasing system, the second time schedule BB may be running in a fixed time loop, such as every 10 ms. The desired cam angle may be determined from a torque request or other parameters, by way of example.

The control system 11 may include a computation module 70 configured to run on a third time schedule, where the computation module 70 is configured to determine a position error difference between the actual system parameter (such as actual cam angle) and the desired system parameter (such as desired cam angle) and determine a desired duty cycle of the square wave signal. Thus, the control operations or method 100 may include performing a step 104 of determining a position error difference between the actual system parameter (e.g., actual cam angle) and the desired system parameter (e.g., desired cam angle), on the third time schedule CC. The method 100 may also include a step 106 of determining the desired duty cycle of the square wave signal, which may be based in part on the position error difference, also on the third time schedule CC.

The third time schedule CC is configured to begin and to run the step of determining the position error difference 104 each time that either one of the actual system parameter and the desired system parameter is determined. In other words, every time step A is completed and every time that step B is completed, the third time schedule CC begins and the step 104 of determining the position error difference is run, and subsequently, the step 106 of determining the desired duty cycle is run. Accordingly, the third time schedule CC synchronizes the first and second time schedules AA, BB by starting upon completion of the events from both of the first and second time schedules AA, BB.

The desired duty cycle may be determined by the computation module and/or in step 106, for example, by using a PID (proportional-plus-derivative-plus-integral) control scheme. This may include referencing a current PID range from a memory in the controller 12. The PID control range may be dynamic in that it may change in magnitude with changes in system conditions. The current position error difference may then be compared to the current PID control range. If the position error difference is within the current PID control range, a suitable control strategy for controllably driving the position error difference toward zero with acceptable transient response is applied to the hydraulic control system 11, such as a conventional control strategy that provides for minimum overshoot, minimum rise and settling time, and minimum oscillation. The state of a stored status flag indicating the state of a learned control duty cycle is analyzed and set. If a new learned control duty cycle flag is set, a new duty cycle is available for the control, requiring a reset of the integrator on which the control command is founded. Thus, the integrator is reset based on the new learned control duty cycle. After re-initializing the integrator, the new learned control duty cycle is reset. Next, or if the new learned control duty flag was not already set, a set of current control gains are referenced, including a proportional gain and an integral gain, which may be dynamic gains in that they may vary in magnitude away from initial calibrated values as a function of variation in learned control duty cycle magnitude. The gains may vary with engine speed (rpm), which is proportional to the rate of rotation of the crankshaft 20.

A desired position command may then be determined as a function the learned control duty cycle, the gains, and the position error difference. The desired position command may then be applied in determining a duty cycle command signal to be applied to the switch 54 to provide for the desired position of the slider of the actuator 16. The duty cycle command signal may be determined in any suitable manner, such as by identifying the current waveform that the coil 56 needs to maintain the PWM valve 14 in a state providing for the desired position and by identifying the PWM signal needed to provide for such current waveform. The desired duty cycle may then be output to a command module 72.

Thus, the step 106 of determining the desired duty cycle may be based in part on the position error difference determined in step 104 and occur after step of determining the position error difference in step 104. Accordingly, the computation module 70 may be configured to determine the desired duty cycle after determining the position error difference, the desired duty cycle being based in part on the position error difference.

The command module 72 is configured to send a duty cycle command signal 74 to a pulse width modulation output unit, such as the PWM control valve 14. The duty cycle command signal 74 is configured to cause the pulse width modulation output unit 14 to output the square wave signal having the desired duty cycle, for example, to the actuator 16. Thus, the method 100 may include a step 108 of sending a duty cycle command to a PWM output unit 14 configured to cause the PWM output unit 14 to output a square wave signal having the desired duty cycle.

In some variations of the control system 11, the controller 12 and method 100 may include controls configured to change the timing of when the duty cycle command is sent to the PWM valve 14. For example, the controller 12 may include a duty cycle determination module 76 configured to determine an actual duty cycle of the square wave signal, which may occur on a fourth time schedule. The computation module 70 may be further configured to determine whether a duty cycle difference between the actual duty cycle and the desired duty cycle exceeds a predetermined large error threshold (a calibrated value). If the duty cycle difference exceeds the predetermined large error threshold, the computation module 70 may be configured to cause an immediate abortion of a current pulse repetition period of the square wave signal and cause the pulse width modulation output unit 14 to start a new pulse repetition period of the square wave signal having the desired duty cycle. If the duty cycle difference does not exceed the predetermined large error threshold, the command module 70 may be configured to allow the current pulse repetition period of the square wave signal to finish and to cause the pulse width modulation output unit 14 to start the new pulse repetition period after the current pulse repetition period is finished.

Thus, the controls or method 100 may include a step 110 of determining the actual duty cycle, for example, on a fourth time schedule DD. The actual duty cycle may be collected from the very last pulse repetition period. In some cases, the fourth time schedule DD may begin and run the step of determining the actual duty cycle every time a falling edge 42 of the target wheel 40 passes the camshaft sensor 46, and/or every time either of the rising and falling edges 42 pass the camshaft sensor 46. The actual duty cycle may be executed twice in every pulse repetition period, for every state change of the output driver switch that switches the actuator 16 to move the phase of the camshaft 18. The actual duty cycle may be determined more often, in order to provide most current data to determine whether there is a large position error difference.

The method 100 may further include a step 112, which may occur on the third time schedule CC, of determining whether a duty cycle difference between the actual duty and the desired duty cycle exceeds a predetermined large error threshold.

If the duty cycle difference does not exceed the predetermined large error threshold, the method 100 may proceed from step 112 along path 114 to step 108 where the duty cycle command is sent to the PWM output unit 14, which (without intervention) occurs after a current pulse repetition period of the current duty cycle finishes. Thus, if the duty cycle difference does not exceed the predetermined large error threshold, the method 100 includes finishing the current pulse repetition period of the square wave signal and starting a new pulse repetition period based on the desired duty cycle determined in step 106 after the current pulse repetition period is finished.

If the duty cycle difference does exceed the predetermined large error threshold, however, as determined in step 112, the method 100 proceeds along a path 116 to a step 118 that includes immediately aborting the current pulse repetition period of the square wave signal and starting a new pulse repetition period having the desired duty cycle determined in step 106. The command to abort the current pulse repetition period and start the new pulse repetition period with the desired duty cycle may be sent through the fourth time schedule DD to the step 108 of sending the duty cycle command to the PWM control unit 14.

Thus, in case of a large change, the controls and/or method 100 resets the pulse repetition period to immediately start over with a new pulse repetition period having the new desired duty cycle.

In FIG. 4, each of the steps running on each of time schedules AA, BB, CC, DD is illustrated with different cross-hatching to indicate on which time schedule each step or task is running. For example, the steps A and 102 may be run on the first time schedule AA; the step B may run on the second time schedule BB; the steps 104, 106, 112, and 118 may run on the third time schedule CC, and the steps 108 and 110 may run on the fourth time schedule DD.

Figure 5:
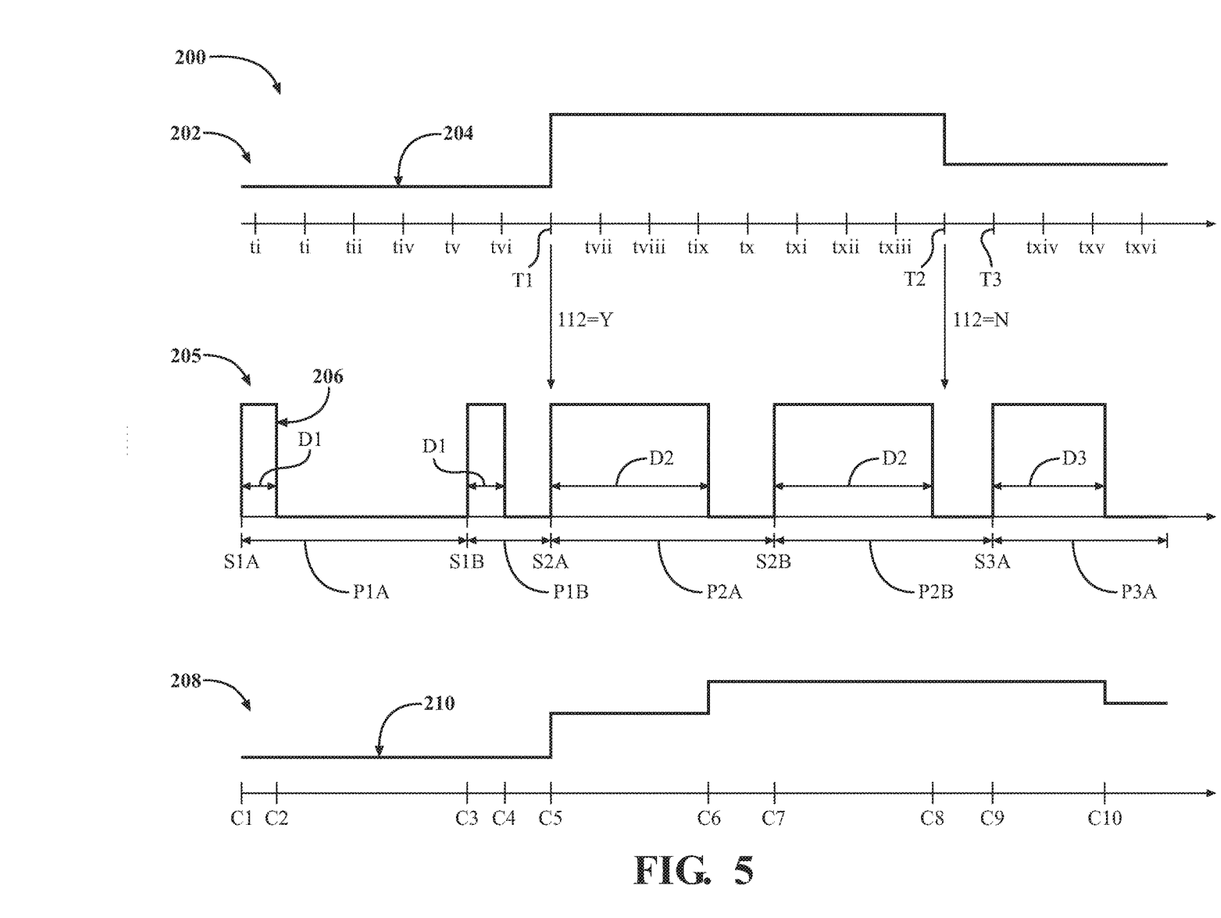
FIG. 5 is a time diagram illustrating a square wave signal affected by desired and actual duty cycles, in accordance with the principles of the present disclosure.

Referring now to FIG. 5, a time diagram 200 further explains the control system 11 and method 100. A top section 202 illustrates the currently available desired duty cycle 204 determined by the computation unit 70 and/or in step 106 at equal spaced apart time intervals beginning at times ti, tii, tiii, tiv, tv, tvi, T1, tvii, tviii, tix, tx, txi, txiii, T2, T3, txiv, txv, and txvi; as explained above, these time intervals may be, for example, 10 ms long. The middle section 205 illustrates the PWM output square wave signal 206, as output by the PWM control valve 14. The bottom section 208 illustrates a state 210 of the output driver switch.

In this example, a pulse repetition period P1A begins at a start point S1A with the output signal in the ON state. The output signal stays ON for the duration of the duty cycle D1 and then shuts off until the start point S1B of the next pulse repetition period start point P1B. The duty cycle D1 of the square wave output signal 206 is based on the available desired duty cycle 204. In the alternative, it should be understood that each pulse repetition period could begin with the output signal in the OFF state.

At time T1, the desired duty cycle 204 increases and it is determined for purposes of this example that the difference between the desired duty cycle 204 and the actual duty cycle D1 exceeds the large error threshold at time T1, and thus 112=Y (yes). Accordingly, the current pulse repetition period P1B is immediately aborted and a new pulse repetition period P2A begins at start point S2A having the new desired duty cycle D2. After the completion of the pulse repetition period P2A, another pulse repetition period P2B (equal in duration to the pulse repetition period P2A) begins at start point S2B having the same desired duty cycle D2 because the available desired duty cycle 204 has not changed between start points S2A and S2B.

However, at time T2, the available desired duty cycle 204 does change and for purposes of this example, it is determined that the difference between the desired duty cycle 204 and the actual duty cycle D2 does not exceed the large error threshold at time T2, and thus 112=N (no). Accordingly, the current pulse repetition period P2B continues past time T2 until the pulse repetition period P2B finishes. At time T3, a new pulse repetition period P3A begins at start point S3A having the new desired duty cycle D3, but no abortion of the last pulse repetition period P2B occurred before starting the new pulse repetition period P3A because the change in the desired duty cycle 204 did not exceed the large error threshold at time T2.

The bottom section 208 illustrates that the actual duty cycle 210 is calculated twice every period P1A, P1B, P2A, P2B, P3A for each state change of the output driver switch. For example, the actual duty cycle is calculated at points C1 and C2 during the first period P1A, at points C3 and C4 during the second period P1B, at points C5 and C6 during the third period P2A, at points C7 and C8 during the fourth period P2B, and at points C9 and C10 during the fifth period P3A.

The synchronization between time schedules AA and BB by beginning time schedule CC each time the critical event occurs in time schedules AA and BB provides for the elimination of delay, such that delay cannot be longer than the longest time schedule. Therefore, the delay is shorter and more predictable, making the actuator 16 prediction more accurate.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 11 may be configured to execute each of the steps of the method 100. Thus, the entire description with respect to FIGS. 1-5 may be applied by the control system 11 to effectuate the method 100 shown in FIG. 4. Furthermore, the control system 11 may be or include a controller that includes a number of control logics that are configured to execute the steps of the method 100.

The controller(s) of the control system 11 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL)

in addition to a language for creating, storing, editing, and executing stored procedures, such as the PL/SQL language mentioned above.

The control system 11 may include algorithms for dynamic prediction, where the time characteristic of output actuators is described in the coefficients of the system's state equation. For example model predictive control (MPC) chooses its output commands such that a target trajectory of system parameters is achieved in an optimized way. This requires that time constants and delays of the actuators are considered in the optimization, which is only possible if they are reproducible and do not depend on variable delays from unsynchronized time schedules. The disclosed control systems and methods minimize these delays by starting the dependent schedules whenever a change on the actual or desired system parameter occurs.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A method for controlling a device that is operable to be switched between an on state and an off state with pulse width modulation of a square wave signal, the method comprising:
    on a first time schedule, performing a step A of determining an actual system parameter;
    on a second time schedule, performing a step B of determining a desired system parameter;
    on a third time schedule, determining a position error difference between the actual system parameter and the desired system parameter, the third time schedule being configured to begin and to run the step of determining the position error difference each time that step A is completed and each time that step B is completed;
    on the third time schedule, determining a desired duty cycle of the square wave signal;
    sending a duty cycle command to a pulse width modulation output unit, the duty cycle command configured to cause the pulse width modulation output unit to output the square wave signal having the desired duty cycle;
    determining an actual duty cycle of the square wave signal;
    determining whether a duty cycle difference between the actual duty cycle and the desired duty cycle exceeds a predetermined large error threshold on the third time schedule;
    if the duty cycle difference exceeds the predetermined large error threshold, immediately aborting a current pulse repetition period of the square wave signal and starting a new pulse repetition period of the square wave signal having the desired duty cycle; and
    if the duty cycle difference does not exceed the predetermined large error threshold, finishing the current pulse repetition period of the square wave signal and starting the new pulse repetition period after the current pulse repetition period is finished.

2. The method of claim 1, wherein the step of determining the desired duty cycle is performed after the step of determining the position error difference, the desired duty cycle being based in part on the position error difference.

3. The method of claim 2, wherein the step of determining the actual duty cycle is performed on a fourth time schedule, wherein the step of immediately aborting the current pulse repetition period and starting the new pulse repetition period based on the desired duty cycle if the duty cycle difference exceeds the predetermined large error threshold is performed on the third time schedule, and wherein the step of finishing the current pulse repetition period and starting the new pulse repetition period after the current pulse repetition period is finished if the duty cycle difference does not exceed the predetermined large error threshold is performed on the fourth time schedule.

4. The method of claim 3, wherein performing the step A of determining the actual system parameter on the first time schedule includes determining an actual camshaft angle with respect to a crankshaft angle, and wherein performing the step B of determining the desired system parameter includes determining a desired phase, the desired phase being a desired camshaft angle with respect to the crankshaft angle.

5. The method of claim 4, wherein the fourth time schedule is configured to begin and to perform the step of determining the actual duty cycle when a falling edge of a camshaft target wheel passes a camshaft sensor.

6. The method of claim 4, wherein the fourth time schedule is configured to begin and to perform the step of determining the actual duty cycle when an edge of a camshaft target wheel passes a camshaft sensor, the edge being one of a rising edge and a falling edge.

7. The method of claim 4, wherein the step of sending the duty cycle command to the pulse width modulation output unit is configured to cause the pulse width modulation output unit to output the square wave signal to control rotational phasing between the actual camshaft angle and the crankshaft angle, the method further comprising controlling an oil control valve with the square wave signal to establish a pressure balance between a first chamber and a second chamber by driving the actuator.

8. A control system for controlling an actuator that is operable to be switched into an on state and an off state with pulse width modulation of a square wave signal, the control system comprising:
    a system parameter detection module configured to determine an actual system parameter on a first time schedule;
    a system desire module configured to determine a desired system parameter on a second time schedule;
    a computation module configured to run on a third time schedule, the computation module configured to:
        determine a position error difference between the actual system parameter and the desired system parameter, the third time schedule being configured to begin and to run the step of determining the position error difference each time that the system parameter detection module determines the actual system parameter and each time that the system desire module determines the desired system parameter; and
        determine a desired duty cycle of the square wave signal;
    a pulse width modulation output unit configured to output the square wave signal having the desired duty cycle;
    a command module configured to send a duty cycle command to the pulse width modulation output unit, the duty cycle command configured to cause the pulse width modulation output unit to output the square wave signal having the desired duty cycle; and
    a duty cycle determination module configured to determine an actual duty cycle of the square wave signal,
    wherein the computation module is further configured to determine whether a duty cycle difference between the actual duty cycle and the desired duty cycle exceeds a predetermined large error threshold; if the duty cycle difference exceeds the predetermined large error threshold, the computation module is configured to cause an immediate abortion of a current pulse repetition period of the square wave signal and cause the pulse width modulation output unit to start a new pulse repetition period of the square wave signal having the desired duty cycle; and if the duty cycle difference does not exceed the predetermined large error threshold, the command module is configured to allow the current pulse repetition period of the square wave signal to finish and to cause the pulse width modulation output unit to start the new pulse repetition period after the current pulse repetition period is finished.

9. The control system of claim 8, wherein the computation module is configured to determine the desired duty cycle after determining the position error difference, the desired duty cycle being based in part on the position error difference.

10. The control system of claim 9, wherein the duty cycle determination module is configured to determine the actual duty cycle of the square wave signal on a fourth time schedule.

11. The control system of claim 10, wherein the actual system parameter includes an actual camshaft angle with respect to a crankshaft angle, and wherein the desired system parameter includes a desired phase, the desired phase being a desired camshaft angle with respect to the crankshaft angle.

12. The control system of claim 11, wherein the duty cycle determination module is configured to begin the fourth time schedule and determine the actual duty cycle when a falling edge of a target camshaft wheel passes a camshaft sensor.

13. The control system of claim 11, wherein the duty cycle determination module is configured to begin the fourth time schedule and determine the actual duty cycle when an edge of a camshaft target wheel passes a camshaft sensor, the edge being one of a rising edge and a falling edge.

14. The control system of claim 11, wherein the control system is configured to control rotational phasing between the actual camshaft angle and the crankshaft angle, the control system being configured to control an oil control valve with the square wave signal to establish a pressure balance between a first chamber and a second chamber by driving the actuator.

15. A variable valve timing system for a motor vehicle, the variable valve timing system comprising:
a camshaft configured to rotate and to control opening of a poppet valve;
a camshaft phaser actuator defining a phaser cavity;
a camshaft target wheel fixed to the camshaft and having a plurality of target edges;
a camshaft sensor configured to sense the target edges;
a pulse width modulated (PWM) control valve, the PWM control valve configured to be switched into an on state and an off state with pulse duration modulation of a square wave signal to control the flow of hydraulic fluid into and out of the phaser cavity to control an angular position of the camshaft with respect to a crankshaft; and
a control system comprising:
a camshaft angle detection module configured to determine an actual camshaft angle with respect to a crankshaft angle on a first time schedule based on feedback from the camshaft sensor including timing of sensing at least one target edge;
a desired phase module configured to determine a desired camshaft angle with respect to the crankshaft angle on a second time schedule;
a computation module configured to run on a third time schedule, the computation module configured to:
determine a position error difference between the actual camshaft angle and the desired camshaft angle, the third time schedule being configured to begin and to run the step of determining the position error difference each time that the camshaft angle detection module determines the actual camshaft angle and each time that the desired phase module determines the desired camshaft angle; and
determine a desired duty cycle of the square wave signal;
a command module configured to send a duty cycle command to the PWM control valve, the duty cycle command configured to cause the PWM control valve to output the square wave signal having the desired duty cycle; and
a duty cycle determination module configured to determine an actual duty cycle of the square wave signal, the computation module being further configured to determine whether a duty cycle difference between the actual duty cycle and the desired duty cycle exceeds a predetermined large error threshold; if the duty cycle difference exceeds the predetermined large error threshold, the computation module is configured to cause an immediate abortion of a current pulse repetition period of the square wave signal and cause the pulse width modulation output unit to start a new pulse repetition period of the square wave signal having the desired duty cycle; and if the duty cycle difference does not exceed the predetermined large error threshold, the command module is configured to allow the current pulse repetition period of the square wave signal to finish and to cause the pulse width modulation output unit to start the new pulse repetition period after the current pulse repetition period is finished.

16. The variable valve timing system of claim 15, wherein the computation module is configured to determine the desired duty cycle after determining the position error difference, the desired duty cycle being based in part on the position error difference, the duty cycle determination module being configured to determine the actual duty cycle of the square wave signal on a fourth time schedule.

17. The variable valve timing system of claim 16, wherein the duty cycle determination module is configured to begin the fourth time schedule and determine the actual duty cycle when a target edge of the plurality of target edges passes the camshaft sensor.

* * * * *